(12) United States Patent
Sun et al.

(10) Patent No.: US 11,106,939 B2
(45) Date of Patent: Aug. 31, 2021

(54) PROCESSING METHOD FOR HIGH ORDER TENSOR DATA

(71) Applicant: Beijing University of Technology, Beijing (CN)

(72) Inventors: Yanfeng Sun, Beijing (CN); Fujiao Ju, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 68 days.

(21) Appl. No.: 16/709,947

(22) Filed: Dec. 11, 2019

(65) Prior Publication Data

US 2020/0226417 A1    Jul. 16, 2020

(30) Foreign Application Priority Data

Jan. 10, 2019 (CN) .......................... 201910022095.X

(51) Int. Cl.
  *G06K 9/62* (2006.01)
  *G06K 9/44* (2006.01)

(52) U.S. Cl.
  CPC .............. *G06K 9/6234* (2013.01); *G06K 9/44* (2013.01); *G06K 9/6202* (2013.01); *G06K 9/6268* (2013.01)

(58) Field of Classification Search
  CPC ...... G06K 9/6234; G06K 9/44; G06K 9/6202; G06K 9/6268
  See application file for complete search history.

(56) References Cited

U.S. PATENT DOCUMENTS

| 2008/0310687 A1* | 12/2008 | Hua ...................... G06K 9/6232 382/118 |
| 2010/0092046 A1* | 4/2010 | Vasilescu .............. G06F 21/608 382/118 |
| 2011/0026849 A1* | 2/2011 | Kameyama ........ G06K 9/00308 382/260 |

OTHER PUBLICATIONS

Yale face database, http://vision.ucsd.edu/content/yale-face-database.
AR face database, http://rvl1.ecn.purdue.edu/aleix/aleix_face_DB.html.
Li Ming, Yuan Baozong, "2D-LDA: A statistical linear discriminant analysis for image matrix", Pattern Recognition Letters 26 (2005) 527-532.

(Continued)

*Primary Examiner* — David F Dunphy
(74) *Attorney, Agent, or Firm* — Bayramoglu Law Offices LLC

(57) ABSTRACT

A processing method for high-order tensor data, which can avoid that the vectorization process of the image observation sample set damage the internal structure of the data, simplify the large amount of redundant information in the high-order tensor data in the image observation sample set, and improve the image processing speed. In this processing method for high-order tensor data, the high-order tensor data are divided into three parts: the shared subspace component, the personality subspace component and the noise part; the shared subspace component and the personality subspace component respectively represent the high-order tensor data as a group of linear combination of the tensor base and the vector coefficient; the variational EM method is used to solve the base tensor and the vector coefficient; design a classifier to classify the test samples by comparing the edge distribution of samples.

8 Claims, 2 Drawing Sheets

(56) References Cited

OTHER PUBLICATIONS

Chu Delin, ET. AL., "Incremental Linear Discriminant Analysis: A Fast Algorithm and Comparisons", IEEE Transaactions on Neural Networks and Learning Systems, vol. 26, No. 11, Nov. 2015.
Simon J.D. Prince, James H. Elder, "Probabilistic Linear Discriminant Analysis for Inferences About Identity", IEEE, 2007.
Wen Jie, ET. AL., "Robust Sparse Linear Discriminant Analysis", IEEE Transaction on Circuits and Systems for Video Technology, vol. 29, No. 2, Feb. 2019.
Lai Zhihui, ET. AL., "Sparse Tensor Discriminant Analysis" IEEE Transactions on Image Processing, vol. 22, No. 10, Oct. 2013.

* cited by examiner

PROCESSING METHOD FOR HIGH ORDER TENSOR DATA

CROSS REFERENCE TO THE RELATED APPLICATIONS

This application is based upon and claims priority to Chinese Patent Application No. CN201910022095.X, filed on Jan. 10, 2019, the entire contents of which are incorporated herein by reference.

TECHNICAL FIELD

The present invention relates to the technical field of data processing, and particularly to a processing method for high order tensor data, which is mainly used for the processing of video sequence, RGB-D sequence and other data.

BACKGROUND

With the development of science and technology, a large number of high-order tensor data emerge, such as video sequence, RGB-D sequence and so on. Because there are a lot of redundant information in high-order tensor data, it is often necessary to extract features or reduce dimensions before data analysis.

The traditional way of dimensionality reduction is to quantize the tensor data, and then use the vector dimensionality reduction method. The process of dimensionality will destroy the structure of the data, and can not make use of the internal structure of high-order tensor data. In addition, two commonly used dimensionality reduction methods for higher-order tensors are CandeComp/PARAFAC (CP) decomposition and Tucker decomposition. The feature dimension extracted by CP decomposition is determined by the rank of CP decomposition, which is not flexible. Tucker decomposition is more complex to extract features from test samples, so it is more suitable for clustering than classification.

SUMMARY

The technical problem addressed by the present invention is to overcome the deficiency in the prior art, and to provide a processing method for high-order tensor data, which can avoid that the vectorization process of the image observation sample set damage the internal structure of the data, which is flexible and simple, which can extract the discriminant features of the tensor sample, simplify the large amount of redundant information in the high-order tensor data in the image observation sample set, and improve the image processing speed.

The technical solution of the present invention is that, in this processing method for high-order tensor data, the high-order tensor data are divided into three parts: the shared subspace component, the personality subspace component and the noise part; the shared subspace component and the personality subspace component respectively represent the high-order tensor data as a group of linear combination of the tensor base and the vector coefficient; the variational EM method is used to solve the base tensor and the vector coefficient; design a classifier to classify the test samples by comparing the edge distribution of samples.

Compared with the traditional linear discriminant method, the present invention extracts the common feature and the individual feature directly from the tensor data in two spaces respectively. In each space, by the structural feature of the tensor, it constructs a representation way from the tensor data to the vector data, so as to extract the discriminant feature of the tensor sample, thus avoiding that the vectorization process of the image observation sample set damage the internal structure of the data, which is flexible and simple, which can extract the discriminant features of the tensor sample, simplify the large amount of redundant information in the high-order tensor data in the image observation sample set, and improve the image processing speed.

DETAILED DESCRIPTION OF THE EMBODIMENTS

Figure 1:
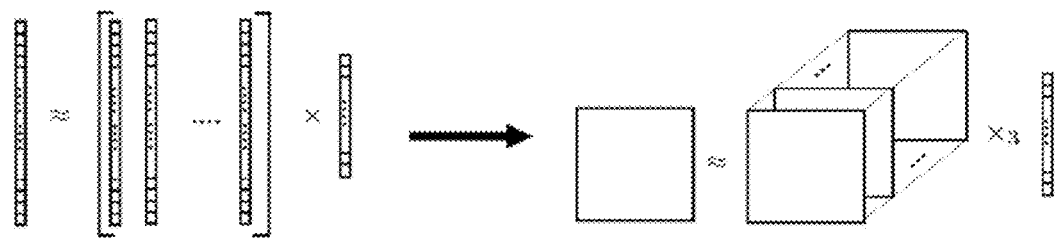
FIG. 1 shows a schematic diagram of formula (1) according to the invention.

As shown as FIG. 1, in this processing method for high-order tensor data, the high-order tensor data are divided into three parts: the shared subspace component, the personality subspace component and the noise part; the shared subspace component and the personality subspace component respectively represent the high-order tensor data as a group of linear combination of the tensor base and the vector coefficient; the variational EM method is used to solve the base tensor and the vector coefficient; design a classifier to classify the test samples by comparing the edge distribution of samples.

Compared with the traditional linear discriminant method, the present invention extracts the common feature and the individual feature directly from the tensor data in two spaces respectively. In each space, by the structural feature of the tensor, it constructs a representation way from the tensor data to the vector data, so as to extract the discriminant feature of the tensor sample, thus avoiding that the vectorization process of the image observation sample set damage the internal structure of the data, which is flexible and simple, which can extract the discriminant features of the tensor sample, simplify the large amount of redundant information in the high-order tensor data in the image observation sample set, and improve the image processing speed.

Preferably, two dimensional model is assuming an observed data set $y=\{Y_{ij}\}_{i=1,j=1}^{I,N_i}$, which consist of N images of I individuals and each individual has Ni images. Yij represents the jth image of the ith individual and it will be modeled as formula (1):

$$Y_{ij} = \mathcal{F} \times_3 h_i^T + \mathcal{W} \times_3 g_{ij}^T + M + E_{ij} \qquad (1)$$

In this model, $\mathcal{F} \times_3 h_i^T$ or $\mathcal{W} \times_3 g_{ij}^T$ can be regarded as the generalization of vector representation for a given sample, $\mathcal{F}$ and $\mathcal{W}$ are the factor tensors consisting of base matrices in shared subspace and individual subspace, respectively. $\times_3$ represents the product of tensor and matrix (vector), $h_i \in \mathbb{R}^{K_1}$ is a shared latent variable crossing all the images $Y_{i1}, \ldots, Y_{iN_i}$ of object/class i and $g_{ij} \in \mathbb{R}^{K_2}$ represents the coefficient of the jth sample of the ith object in individual space. M is the mean matrix of the data, suppose M=0. $E_{ij}$ is a stochastic noise term, each element in which follows the normal distribution $\mathcal{N}(0, \sigma^2)$.

Preferably, the vector of model (1) is formula (2)

$$\text{vec}(Y_{ij}) = Fh_i + Wg_{ij} + \text{vec}(M) + \text{vec}(E_{ij}) \quad (2)$$

in which, the columns and $f_{k_1}$ and $w_{k_2}$ in matrix F and W is respectively k1, k2 face of tensor $\mathcal{F}$ and $\mathcal{W}$, are used to restrict the base tensor by CP decomposition of tensor. Assuming $$\mathcal{F} = [\![\lambda; F^{(1)}, F^{(2)}, F^{(h)}]\!] = \sum_{r=1}^{R_1} \lambda_r f_{1,r}^{(1)} \circ f_{1,r}^{(2)} \circ f_{1,r}^{(h)}$$

and $$\mathcal{W} = [\![\eta; W^{(1)}, W^{(2)}, W^{(g)}]\!] = \sum_{r=1}^{R_2} \eta_r w_{1,r}^{(1)} \circ w_{1,r}^{(2)} \circ w_{1,r}^{(g)}.$$

Preferably, assuming $Q(h, g, \rho)$ is any joint distribution over the hidden variables, find that a lower bound on likelihood of the observed data is formula (2), $$\begin{aligned}\mathcal{L}(\Theta) &= \log p(\mathcal{Y} \mid \Theta) \\ &\geq \int_h \int_g \int_\rho Q(h,g,\rho) \log \frac{p(\mathcal{Y},h,g,\rho)}{Q(h,g,\rho)} dh dg d\rho \\ &= E_{h,g,\rho}[\log p(\mathcal{Y} \mid h, g, \rho)] + E_h\left[\log\frac{p(h)}{Q(h)}\right] \\ &\quad + E_g\left[\log\frac{p(g)}{Q(g)}\right] + E_\rho\left[\log\frac{p(\rho)}{Q(\rho)}\right] \\ &\triangleq \hat{\mathcal{L}}(Q(h), Q(g), Q(\rho), \Theta)\end{aligned} \quad (3)$$

The second equation of the formula (3) is based on the feature of separation of $Q(h, g, \rho)$, $Q(h, g, \rho) = Q(h)Q(g)Q(\rho)$.

Preferably, assuming a high-order observed data set $\{y_{ij} | y_{ij} \in \mathbb{R}^{D_1 \times \cdots \times D_M}; i = 1, \ldots, I, j = 1, \ldots, N_i, \Sigma_i N_i = N\}$. each sample is a tensor of order M, and the linear discriminant analysis model of higher-order tensor is formula (4)

$$y_{ij} = \mathcal{F} \times_{(M+1)} h_i^T + \mathcal{W} \times_{(M+1)} g_{ij}^T + \mathcal{E}_{ij} \quad (4)$$

Wherein $h_i \in \mathbb{R}^{K_1}$, $g_{ij} \in \mathbb{R}^{K_2}$, $\mathcal{F}$ and $\mathcal{W}$ is a tensor of order (M+1), whose size is respectively $D_1 \times \cdots \times D_M \times K_1$ and $D_1 \times \cdots \times D_M \times K_2$. Assuming base tensor has the structure of CP decomposition, $$\mathcal{F} = [\![F^{(1)}, F^{(2)}, \ldots, F^{(M)}, F^{(h)}]\!]$$

$$= \sum_{r=1}^{R_1} f_{1,r}^{(1)} \circ f_{1,r}^{(2)} \circ \ldots \circ f_{1,r}^{(M)} \circ f_{1,r}^{(h)}$$

and $$\mathcal{W} = [\![W^{(1)}, W^{(2)}, \ldots, W^{(M)}, W^{(g)}]\!]$$

$$= \sum_{r=1}^{R_2} w_{1,r}^{(1)} \circ w_{1,r}^{(2)} \circ \ldots \circ w_{1,r}^{(M)} \circ w_{1,r}^{(g)}.$$

Preferably, for higher-order model, EM algorithm is used to solve the problem, therefore the posterior of $h_i$ is still a multivariate normal distribution. The mean and covariance matrix are, respectively, $$\bar{h}_i = \left(\sum_{\mathcal{F}} + \frac{1}{\bar{\rho} N_i} I_{K_1}\right) a_i$$

$$\sum_h = \left(I_{K_1} + \frac{\bar{\rho} N}{I} \sum_{\mathcal{F}}\right)^{-1}$$

where, $$\Sigma_{\mathcal{F}} = F^{(h)}[(F^{(m)T}F^{(m)}) \odot (\overline{F}^{(m)T}\overline{F}^{(m)})]F^{(h)T}$$

$$a_i = F^{(h)}\text{diag}(F^{(m)T}Y_{(m)}{}^i \overline{F}^{(m)}).$$

Where $\odot$ represents the Hadamard elementwise product.

Define $$\bar{y}_i = \frac{1}{N_i} \sum_{j=1}^{N_i} (\mathcal{Y}_{ij} - \mathcal{W} \times_{(M+1)} g_{ij}),$$

then $\overline{Y}_{(m)}{}^i$ represents the mode-m metricized version of $\bar{y}_i$, and $$\overline{F}^{(m)} = F^{(M)} \circledast \ldots \circledast F^{(m+1)} F^{(m-1)} \circledast \ldots \circledast F^{(1)}$$

Where $\circledast$ represents the Khatri-Rao product.

By computing, the posterior of $\bar{g}_{ij}$ is still a multivariate Gauss distribution, and the mean and covariance of latent variable $g_{ij}$ have become $$\bar{g}_{ij} = (\Sigma_{\mathcal{W}} + 1/\bar{\rho} I_K)^{-1} b_{ij}$$

$$\Sigma_g = (I_K + \bar{\rho} \Sigma_{\mathcal{W}})^{-1}$$

where $$b_{ij} = W^{(g)} \text{diag}(W^{(m)T} \hat{Y}_{(m)}{}^{ij} \overline{W}^{(m)})$$

$$\Sigma_{\mathcal{W}} = W^{(g)}[(W^{(m)T}W^{(m)}) \odot (\overline{W}^{(m)T}\overline{W}^{(m)})]W^{(g)T}$$

Let $\hat{y}_{ij} = y_{ij} - \mathcal{F} \times_{(M+1)} h_i^T$, and $\hat{Y}_{(m)}{}^{ij}$ represents the mode-m metricized version of $\hat{y}_{ij}$. And $$\overline{W}^{(m)} = W^{(M)} \circledast \ldots \circledast W^{(m+1)} \circledast$$
$$W^{(m-1)} \circledast \ldots \circledast W^{(1)}$$

The optimal $Q^*(\rho)$ is still a Gamma distribution.

In M-step, taking derivatives of $\tilde{\mathcal{L}}$ with respect to $F^{(n)}$ (n=1, ..., N) and $F^{(h)}$, and letting them be zero, obtain $$F^{(m)} = \left[\sum_{i=1}^{I} \sum_{j=1}^{N_i} \tilde{Y}_{(m)}^{ij} \overline{F}^{(m)} \text{Diag}(h_i^T F^{(h)})\right]$$

$$\left[(\overline{F}^{(m)T}\overline{F}^{(m)}) \odot \left(NF^{(h)T}\sum_h F^{(h)} + F^{(h)T}\tilde{H}\tilde{H}^T F^{(h)}\right)\right]^{-1}$$

$$F^{(h)} = \left[\tilde{H}\tilde{H}^T + N\sum_h\right]^{-1} \left[\sum_{i=1}^{I}\sum_{j=1}^{N_i} h_i \left[\text{diag}(\overline{F}^{(m)T}\tilde{Y}_{(m)}^{(ij)T} F^{(m)})\right]^T\right]$$

$$\left[(F^{(m)T}F^{(m)}) \odot (\overline{F}^{(m)T}\overline{F}^{(m)})\right]^{-1}.$$

Denote $\tilde{Y}_{(m)}{}^{ij}$ presents the mod-m metricized version of $\tilde{y}_{ij}$. And $\tilde{y}_{ij} = y_{ij} - \mathcal{W} \times_{(M+1)} g_{ij}$, Taking derivatives of $\tilde{\mathcal{L}}$ with respect to $W^{(m)}$ (m=1, ..., M) and $W^{(h)}$, and letting them be zero, obtain $$W^{(m)} = \left[\sum_{i=1}^{I}\sum_{j=1}^{N_i} \tilde{Y}_{(m)}^{ij} \overline{W}^{(m)} \text{Diag}(g_{ij}^T W^{(g)})\right]$$

$$\left[(\overline{W}^{(m)T}\overline{W}^{(m)}) \odot \left(NW^{(g)T}\sum_g W^{(g)} + W^{(g)T}GG^TW^{(g)}\right)\right]^{-1} \text{ and}$$

$$W^{(h)} = \left[GG^T + N\sum_g\right]^{-1}\left[\sum_{i=1}^{I}\sum_{j=1}^{N_i} g_{ij}[\text{diag}(\overline{W}^{(m)T}\tilde{Y}_{(m)}^{(ij)T}W^{(m)})]^T\right]$$

$$\left[(W^{(m)T}W^{(m)}) \odot (\overline{W}^{(m)T}\overline{W}^{(m)})\right]^{-1}.$$

Preferably, for a sample $Y_p$ to be classified, its category by calculating the likelihood under a model. The key point of recognition is that samples in the same class share the same identity variable. Assuming $Y_1 \ldots _N$ is observed samples, if $Y_p$ and one particular Yi belong to the same category, they shall share the same h.

Preferably, Y1 and Yp belongs to the same category and both of identity variables are h1. In this case, the likelihood of observed samples and Yp as $p_1(Y_1, Y_2, Y_p)$, Yp and Y2 came from the same category with the identity variable h2 and the likelihood can be represented as $p_2(Y_1, Y_2, Y_p)$. Then we compare $p_1$ and $p_2$, and find out the largest likelihood value. Thus, Yp belongs to the sample's label corresponding to the largest likelihood. The likelihood of samples can be calculated as follows.

Because $Y_{ij}$ follows a matrix-variate normal conditioned on the latent variables h and g. For convenience, we work with $p(y_{ij})$ instead of $p(Y_{ij})$. Here, we note $y_{ij}:=\text{vec}(Y_{ij})$. Thus, the proposed model (1) can become $$y_{ij}=Fh_i+Wg_{ij}+e_{ij}$$

Where $F=(F^{(2)}\odot F^{(1)})F^{(h)T}$ and $W=(W^{(2)}\odot W^{(1)})W^{(g)T}$

These factor matrices have been learned in training phrase, which are known to the recognition processing. Thus, the likelihood of N equals $$p_n(y_{1\ldots N,p}) = \prod_{i=1, i\neq n}^{N} p(y_i)p(y_p, y_n) \quad (20)$$

Next, we illustrate the marginal distribution of n images $y_{1\ldots n}$ that share the same identity variable h. The generative equations become $$\begin{bmatrix} y_1 \\ y_2 \\ \vdots \\ y_n \end{bmatrix} = \begin{bmatrix} F & W & 0 & \ldots & 0 \\ F & 0 & W & \ldots & 0 \\ \vdots & \vdots & \vdots & \ddots & \vdots \\ F & 0 & 0 & \ldots & W \end{bmatrix} \begin{bmatrix} h \\ g_1 \\ g_2 \\ \vdots \\ g_n \end{bmatrix} + \begin{bmatrix} e_1 \\ e_2 \\ \vdots \\ e_n \end{bmatrix} \quad (5)$$

noting, $$y'=Az'+m'+e'$$

Taking the following probabilistic assumption $$p(z')=\mathcal{N}(0,I)$$

and $$p(e')=\mathcal{N}(0,\sigma^2 I)$$

Converts the model (5) into the form of probabilistic PCA. Thus, the marginal distribution over the observed y' can be easily obtained by integrating out the latent variables as $$p(y')=\mathcal{N}(m',AA^T+\sigma^2 I) \quad (21)$$

By (21), both $p(y_i)$ and $p(y_p, y_n)$ in (20) can be calculated and then we can obtain $P_n(y_1, \ldots, N_p)$. Comparing all $p_n(y_1, \ldots, N_p)$ and finding out the largest value, then the sample Yp is divided into the sample's label corresponding to the largest $p_n(y_1, \ldots, N_p)$.

The invention is described in more detail below.

The technical solution adopted by the invention is a probabilistic linear discriminant analysis method based on tensor data vector expression, and the specific implementation process of the method is as follows.

Two Dimensional Model Construction

Assuming an observed data set $y=\{Y_{ij}\}_{i=1,j=1}^{I,N_i}$, which consist of N images of I individuals and each individual has Ni images ($\Sigma_{i=1}^I N_i=N$). Yij represents the jth image of the ith individual and it will be modeled as formula (1):

$$Y_{ij}=\mathcal{F} \times_3 h_i^T + \mathcal{W} \times_3 g_{ij}^T+M+E_{ij} \quad (1)$$

In this model, $\mathcal{F} \times_3 h_i^T$ or $\mathcal{W} \times_3 g_{ij}^T$ can be regarded as the generalization of vector representation for a given sample, in which coefficient is vector, as shown as FIG. 1. $\mathcal{F}$ and $\mathcal{W}$ are the factor tensors consisting of base matrices in shared subspace and individual subspace, respectively. $\times_3$ represents the product of tensor and matrix (vector). $h_i \in \mathbb{R}^{K_1}$ is a shared latent variable crossing all the images $Y_{i1}, \ldots, Y_{iN_i}$ of object/class i and $g_{ij} \in \mathbb{R}^{K_2}$ represents the coefficient of the jth sample of the ith object in individual space. M is the mean matrix of the data. Without loss of generality, we suppose M=0 (a zero matrix). $E_{ij}$ is a stochastic noise term, each element in which follows the normal distribution $\mathcal{N}(0, \sigma^2)$.

Furthermore, we impose a prior of multivariate normal distribution on latent variables to generate a Bayesian model $$p(h_i) = \mathcal{N}(h_i \mid 0, I_{K_1}) = \left(\frac{1}{2\pi}\right)^{K_1/2} \exp\left\{-\frac{1}{2}h_i^T h_i\right\}$$

and $$p(g_{ij}) = \mathcal{N}(g_{ij} \mid 0, I_{K_2}) = \left(\frac{1}{2\pi}\right)^{K_2/2} \exp\left\{-\frac{1}{2}g_{ij}^T g_{ij}\right\}$$

Letting $$\rho = \frac{1}{\sigma^2},$$

we assume σ satisfies the following Gamma prior:

$$p_\sigma(\rho) = \Gamma(\rho \mid a, b) = \frac{b^a}{\Gamma(a)}\rho^{a-1}\exp\{-b\rho\}$$

After vectorizing model (1), we can obtain the following model:

$$\text{vec}(Y_{ij})=Fh_i+Wg_{ij}+\text{vec}(M)+\text{vec}(E_{ij}) \quad (2)$$

in which, the columns $f_{k_1}$ and $w_{k_2}$ in matrix F and W is respectively k1, k2 face of tensor $\mathcal{F}$ and $\mathcal{W}$, are used to restrict the base tensor by CP decomposition of tensor. Therefore, the model is transformed into the traditional probabilistic linear discriminant analysis. However, a major problem is that the parameters in the model will increase with the increase of the original data. For example, for N-order tensor data, the projections $\mathcal{F}$ and $\mathcal{W}$ are (N+1)-order tensors with $K_1\Pi_n D_n$ and $K_2\Pi_n D_n$ components, respectively. They will quickly reaches billions when the mode dimensionalities $K_1$, $K_2$, $D_{1:N}$ and N are moderate. These make it extremely difficult to learn parameters for base tensors. Hence, we propose to introduce tensor CP decompositions in constructing the multiplicative interactions in tensors $\mathcal{F}$ and $\mathcal{W}$, respectively. Assuming $$\mathcal{F} = [\![\lambda; F^{(1)}, F^{(2)}, F^{(h)}]\!] = \sum_{r=1}^{R_1} \lambda_r f_{1,r}^{(1)} \circ f_{1,r}^{(2)} \circ f_{1,r}^{(h)}$$

and $$\mathcal{W} = [\![\eta; W^{(1)}, W^{(2)}, W^{(g)}]\!] = \sum_{r=1}^{R_2} \eta_r w_{1,r}^{(1)} \circ w_{1,r}^{(2)} \circ w_{1,r}^{(g)}.$$

Solution of the Model

For the above-mentioned model, h, g and ρ are the model latent variables and $\theta=\{F^{(1)}, F^{(2)}, F^{(h)}, W^{(1)}, W^{(2)}, W^{(g)}\}$ represents all the model parameters. Therefore, the joint distribution of a set of given observations y and all the latent variables can be expressed as $$p(\mathcal{Y}, h, g, \rho \mid \Theta) = \prod_{i,j} \mathcal{N}(Y_{ij} - \mathcal{F} \times_3 h_i^T - \mathcal{W} \times_3 w_{ij}^T \mid 0, \sigma I, \sigma I)$$

$$\mathcal{N}(h_i \mid 0, I_{K_1})\mathcal{N}(g_{ij} \mid 0, I_{K_2})p_\sigma(\rho).$$

So the likelihood of the sample is $$\tilde{\mathcal{L}}(\theta) = \log p(y \mid \theta) = \log \iiint p(y,h,g,\rho \mid \theta) dh dg d\rho$$

Furthermore, we investigate the variational electromagnetic (EM) algorithm for the proposed TPLDA model.

As the proposed model depends on unobserved latent variables, we need to find a lower bound on likelihood of the observed data for any variational distribution Q(h, g, ρ) over the hidden variables.

$$\mathcal{L}(\Theta) = \log p(\mathcal{Y} \mid \Theta) \geq \int_h \int_g \int_\rho Q(h, g, \rho) \log \frac{p(\mathcal{Y}, h, g, \rho)}{Q(h, g, \rho)} dh dg d\rho = \quad (3)$$

$$E_{h,g,\rho}[\log p(\mathcal{Y} \mid h, g, \rho)] + E_h\left[\log \frac{p(h)}{Q(h)}\right] + E_g\left[\log \frac{p(g)}{Q(g)}\right] +$$

$$E_p\left[\log \frac{p(\rho)}{Q(\rho)}\right] \triangleq \hat{\mathcal{L}}(Q(h), Q(g), Q(\rho), \Theta)$$

By taking a separable Q(h, g, ρ), that is Q(h, g, ρ)=Q(h)Q(g)Q(ρ), the second equation can be deduced. The variational EM algorithm can be implemented as follows.

1) Variational E-Step: with fixing the current parameter value θ, Q-distributions of latent variables are calculated in E-Step.
   (i). Updating Q-Distribution of $h_i$: From model (1), we can see that $\mathcal{W}$ and $g_{ij}$ are constant with respect to $h_i$; hence, we can rewrite the model (1) as $$\sum_{j=1}^{N_i}(Y_{ij} - \mathcal{W} \times_3 g_{ij}^T) = N_i \mathcal{F} \times_3 h_i^T + \sum_{j=1}^{N_i} E_{ij}$$

Define $$\overline{Y}_i = \frac{1}{N_i}\sum_{j=1}^{N_i}(Y_{ij} - \mathcal{W} \times_3 g_{ij}) \text{ and } \overline{E}_i = \frac{1}{N_i}\sum_{j=1}^{N_i} E_{ij}.$$

Then, the above-mentioned equation becomes $$\overline{Y}_i = \mathcal{F} \times_3 h_i^T + \overline{E}_i$$

And each element in $\overline{E}_i$ follows the normal distribution $$\mathcal{N}\left(0, \frac{\sigma^2}{N_i}\right)$$

with zero mean.

In (3), the last two expectation terms are constant with respect to $h_i$, hence we only need consider computing the first two expectations. The likelihood of observed data p(y|h, g, ρ) in (3) can be obtained using the following equation.

$$p(\mathcal{Y} \mid h, g, \rho) = \prod_{i=1}^{I} \mathcal{N}\left(\overline{Y}_i \mid \mathcal{F} \times_3 h_i^T, \frac{\sigma^2}{N_i}\right)$$

Therefore, the posterior of $h_i$ is still a multivariate normal distribution. The mean and covariance matrix are, respectively, $$\overline{h}_i = \left(\sum_{\mathcal{F}} + \frac{1}{\overline{\rho} N_i} I_{K_1}\right) a_i$$

and $$\sum_h = \left(I_{K_1} + \frac{\overline{\rho} N}{I} \Sigma_\mathcal{F}\right)^{-1}$$

where $$a_i = F^{(h)} \text{diag}(F^{(1)T} \overline{Y}_i F^{(2)})$$

and $$\Sigma_\mathcal{F} = F^{(h)}[(F^{(1)T} F^{(1)}) \odot (F^{(2)T} F^{(2)})] F^{(h)T}$$

Where ⊙ represents the Hadamard elementwise product.
ii) Updating Q-Distribution of $g_{ij}$:
we rewrite model (1) as, $$Y_{ij} - \mathcal{F} \times_3 h_i^T = \mathcal{W} \times_3 g_{ij}^T + E_{ij}$$

Define $\hat{Y}_{ij} = Y_{ij} - \mathcal{F} \times_3 h_i^T$. Then the above-mentioned model has become $$\hat{Y}_{ij} = \mathcal{W} \times_3 g_{ij}^T + E_{ij}$$

Thus, the posterior of $g_{ij}$ is still a multivariate normal distribution. The mean and covariance matrix are, respectively, $$\bar{g}_{ij} = (\Sigma_{\mathcal{W}} + 1/\bar{\rho} I_K)^{-1} b_{ij}$$

and $$\Sigma_g = (I_K + \bar{\rho} \Sigma_{\mathcal{W}})^{-1}$$

Where $$b_{ij} = W^{(g)} \text{diag}(W^{(1)T} \hat{Y}_{ij} W^{(2)})$$

and $$\Sigma_W = W^{(g)} [(W^{(1)T} W^{(1)}) \odot (W^{(2)T} W^{(2)})] W^{(g)T}$$

iii) Updating the posterior of $\rho$:

utilizing Bayesian Theory, the log of optimal $Q^*(\rho)$ distribution can be calculated as expectation of the log joint distribution over all the hidden and visible variables with respect to all the other latent variables. Thus, we can get the following equation:

$$\log Q^*(\rho) = E_{h,g}[\log p(\mathcal{Y}, h, g, \rho \mid \ominus)]$$
$$= \frac{D_1 D_2 N}{2} \log \rho - \frac{\rho}{2} \psi + (a-1)\log \rho - b\rho$$

where $$\psi = \sum_{i=1}^{I} \sum_{j=1}^{N_i} \| Y_{ij} - \mathcal{F} \times_3 \bar{h}_i^T - \mathcal{W} \times_3 \bar{g}_{ij}^T \|_F^2 + Ntr\left( \sum_{\mathcal{F}} \sum_h \right) + Ntr(\Sigma_W \Sigma_g).$$

Thus, Q-Distribution of $\rho$ is proportional to $$Q^*(\rho) \propto \rho^{a-1} + \frac{D_1 D_2 N}{2} \exp\left\{ -b\rho - \frac{\psi}{2}\rho \right\}$$

Therefore, the best $Q^*(\rho)$ is actually a Gamma distribution, wherein the parameters become $$\bar{a} = a + \frac{D_1 D_2 N}{2} \text{ and } \bar{b} = b + \frac{1}{2} \psi.$$

2) Variational M-Step: With all the fixed Q-Distribution of latent variables, maximize all the parameters of $\hat{\mathcal{L}}$ (Q(h), Q(g), Q($\rho$), $\theta$). We select all terms containing parameters $\theta$ in (3) and get $$\hat{\mathcal{L}} \propto E_{h,g,\rho}[\log p(\mathcal{Y}, h, g, \rho [\mathcal{F}, \mathcal{W})]] =$$
$$\sum_{i=1}^{I} \sum_{j=1}^{N_i} \| Y_{ij} - \mathcal{F} \times_3 h_i^T - \mathcal{W} \times_3 g_{ij}^T \|_F^2 +$$
$$Ntr\left( \sum_{\mathcal{F}} \sum_h \right) + Ntr\left( \sum_{\mathcal{W}} \sum_g \right) + C \triangleq \hat{\mathcal{L}}.$$

Where C represents a constant, which is independent with parameter $\theta$. In addition, we can deduce $$\mathcal{F} \times_3 h_i^T = F^{(1)} \text{Diag}(h_i^T F^{(h)}) F^{(2)T}$$

and $$\mathcal{W} \times_3 g_{ij}^T = W^{(1)} \text{Diag}(g_{ij}^T W^{(g)}) W^{(2)T}.$$

Thus, $\hat{\mathcal{L}}$ can be rewritten as $$\hat{\mathcal{L}} \propto \sum_{i=1}^{I} \sum_{j=1}^{N_i} \| \tilde{Y}_{ij} - F^{(1)} \text{Diag}(h_i^T F^{(h)}) F^{(2)T} \|_F^2 +$$
$$Ntr\left( [(F^{(1)T} F^{(1)}) \odot (F^{(2)T} F^{(2)})] F^{(h)T} \sum_h F^{(h)} \right)$$

where $$\tilde{Y}_{ij} = Y_{ij} - \mathcal{W} \times_3 g_{ij}^T$$

Taking derivatives of objective function $\hat{\mathcal{L}}$ with respect to $F^{(1)}$, $F^{(2)}$ and $F^{(h)}$, we have $$F^{(1)} = \left[ \sum_{i=1}^{I} \sum_{j=1}^{N_i} \tilde{Y}_{ij} F^{(2)} \text{Diag}(h_i^T F^{(h)}) \right]$$

$$\left[ (F^{(2)T} F^{(2)}) \odot \left( N F^{(h)T} \sum_h F^{(h)} + F^{(h)T} \tilde{H} \tilde{H}^T F^{(h)} \right) \right]^{-1},$$

$$F^{(2)} = \left[ \sum_{i=1}^{I} \sum_{j=1}^{N_i} \tilde{Y}_{ij}^T F^{(1)} \text{Diag}(h_i^T F^{(h)}) \right]$$

$$\left[ (F^{(1)T} F^{(1)}) \odot \left( N F^{(h)T} \sum_h F^{(h)} + F^{(h)T} \tilde{H} \tilde{H}^T F^{(h)} \right) \right]^{-1} \text{ and}$$

$$F^{(h)} = \left[ \tilde{H} \tilde{H}^T + N \sum_h \right]^{-1} \left[ \sum_{i=1}^{I} \sum_{j=1}^{N_i} h_i \left[ \text{diag}(F^{(2)T} \tilde{Y}_{ij}^T F^{(1)}) \right]^T \right]$$

$$\left[ (F^{(1)T} F^{(1)}) \odot (F^{(2)T} F^{(2)}) \right]^{-1}$$

Note that $\tilde{H} \in \mathbb{R}^{K_1 \times N}$ is made up of all samples' $h_i$ and the columns corresponding to the same identity are equal. $\hat{\mathcal{L}}$ can be rewritten as $$\hat{\mathcal{L}} \propto \sum_{i=1}^{I} \sum_{j=1}^{N_i} \| \tilde{Y}_{ij} - W^{(1)} \text{Diag}(g_{ij}^T W^{(g)}) W^{(2)T} \|_F^2 +$$
$$Ntr([(W^{(1)T} W^{(1)}) \odot (W^{(2)T} W^{(2)})] W^{(g)T} \Sigma_g W^{(g)})$$

Taking derivatives of objective function $\hat{\mathcal{L}}$ with respect to $W^{(1)}$, $W^{(2)}$ and $W^{(h)}$, and letting them be zero, we have $$W^{(1)} = \left[ \sum_{i=1}^{I} \sum_{j=1}^{N_i} \hat{Y}_{ij} W^{(2)} \text{Diag}(g_{ij}^T W^{(g)}) \right]$$

$$\left[ (W^{(2)T} W^{(2)}) \odot \left( N W^{(g)T} \sum_g W^{(g)} + W^{(g)T} G G^T W^{(g)} \right) \right]^{-1}$$

$$W^{(2)} = \left[ \sum_{i=1}^{I} \sum_{j=1}^{N_i} \hat{Y}_{ij}^T W^{(1)} \text{Diag}(g_{ij}^T W^{(g)}) \right]$$

-continued $$\left[(W^{(1)T}W^{(1)})\odot\left(NW^{(g)T}\sum_g W^{(g)}+W^{(g)T}GG^TW^{(g)}\right)\right]^{-1} \text{ and}$$

$$W^{(g)}=\left[GG^T+N\sum_g\right]^{-1}\left[\sum_{i=1}^{I}\sum_{j=1}^{N_i}g_{ij}\left[\text{diag}(W^{(2)T}\hat{Y}_{ij}^T W^{(1)})\right]^T\right]$$

$$[(W^{(1)T}W^{(1)})\odot(W^{(2)T}W^{(2)})]^{-1}$$

3) Overall Algorithm: The entire variational EM algorithm is composed of two steps. In E-Step, fixing all parameters in θ, hidden variables are updated as their Q-distributions. In M-Step, fixing all the hidden variable posteriors we update parameters. The two steps are conducted alternatively until a termination condition is satisfied.

Define $\tilde{H}_t$ and $G_t$ as coefficient matrices in t-step. Thus, the reconstruction errors between the original and the reconstructed image sets can be represented as $$e(t)=1-\frac{\|\mathcal{Y}-\mathcal{F}_t\times_3\tilde{H}_t^T-\mathcal{W}_t\times_3 G_t^T\|_F}{\|\mathcal{Y}\|_F}$$

When the reconstruction errors are enough small or iterative number exceeds the defined value, the algorithm stops.

High Dimensional Model Construction assuming a high-order observed data set $\{y_{ij}|y_{ij}\in\mathbb{R}^{D_1\times\ldots\times D_M}; i=1,\ldots,I, j=1,\ldots,N_i, \Sigma_i N_i=N\}$ each sample is a tensor of order M, and the linear discriminant analysis model of higher-order tensor is $$y_{ij}=\mathcal{F}\times_{(M+1)}h_i^T+\mathcal{W}\times_{(M+1)}g_{ij}^T+\varepsilon_{ij} \quad (4)$$

Wherein $h_i\in\mathbb{R}^{K_1}$, $g_{ij}\in\mathbb{R}^{K_2}$, $\mathcal{F}$ and $\mathcal{W}$ is a tensor of order (M+1), whose size is respectively $D_1\times\ldots\times D_M\times K_1$ and $D_1\times\ldots\times D_M\times K_2$. Similar with the two order model, assuming base tensor has the structure of CP decomposition, $$\mathcal{F}=[\![F^{(1)},F^{(2)},\ldots,F^{(M)},F^{(h)}]\!]$$

$$=\sum_{r=1}^{R_1}f_{1,r}^{(1)}\circ f_{1,r}^{(2)}\circ\ldots\circ f_{1,r}^{(M)}\circ f_{1,r}^{(h)}$$

and $$\mathcal{W}=[\![W^{(1)},W^{(2)},\ldots,W^{(M)},W^{(g)}]\!]$$

$$=\sum_{r=1}^{R_2}w_{1,r}^{(1)}\circ w_{1,r}^{(2)}\circ\ldots\circ w_{1,r}^{(M)}\circ w_{1,r}^{(g)}.$$

The Solution of High Dimensional Model Algorithm

For higher-order model, EM algorithm is used to solve the problem, therefore the posterior of $h_i$ is still a multivariate normal distribution. The mean and covariance matrix are, respectively, $$\bar{h}_i=\left(\sum_{\mathcal{F}}+\frac{1}{\bar{\rho}N_i}I_{K_1}\right)a_i$$

$$\sum_h=\left(I_{K_1}+\frac{\bar{\rho}N}{I}\sum_{\mathcal{F}}\right)^{-1}$$

where, $$\Sigma_{\mathcal{F}}=F^{(h)}[(F^{(m)T}F^{(m)})\odot(\overline{F}^{(m)T}\overline{F}^{(m)})]F^{(h)T}$$

$$a_i=F^{(h)}\text{diag}(F^{(m)T}Y_{(m)}^i\overline{F}^{(m)}).$$

Where ⊙ represents the Hadamard elementwise product. Define $$\bar{y}_i=\frac{1}{N_i}\sum_{j=1}^{N_i}(y_{ij}-\mathcal{W}\times_{(M+1)}g_{ij}),$$

then $\overline{Y}_{(m)}^i$ represents the mode-m metricized version of $\bar{y}_i$, and $$\overline{F}^{(m)}=F^{(M)}\circledast\ldots\circledast F^{(m+1)}\circledast F^{(m-1)}\circledast\ldots\circledast F^{(1)}$$

Where ⊛ represents the Khatri-Rao product.

By computing, the posterior of $\bar{g}_{ij}$ is still a multivariate Gauss distribution, and the mean and covariance of latent variable $g_{ij}$ have become $$\bar{g}_{ij}=(\Sigma_{\mathcal{W}}+1/\bar{\rho}I_K)^{-1}b_{ij}$$

$$\Sigma_g=(I_K+\bar{\rho}\Sigma_{\mathcal{W}})^{-1}$$

where $$b_{ij}=W^{(g)}\text{diag}(W^{(m)T}\hat{Y}_{(m)}^{ij}\overline{W}^{(m)})$$

$$\Sigma_{\mathcal{W}}=W^{(g)}[(W^{(m)T}W^{(m)})\odot(\overline{W}^{(m)T}\overline{W}^{(m)})]W^{(g)T}$$

Let $\hat{y}_{ij}=y_{ij}-\mathcal{F}\times_{(M+1)}h_i^T$, and $\hat{Y}_{(m)}^{ij}$ represents the mode-m metricized version of $\hat{y}_{ij}$. And $$\overline{W}^{(m)}=W^{(M)}\circledast\ldots\circledast W^{(m+1)}\circledast W^{(m-1)}\circledast\ldots\circledast W^{(1)}$$

The optimal $Q^*(\rho)$ is still a Gamma distribution.

In M-step, taking derivatives of $\tilde{\mathcal{L}}$ with respect to $F^{(n)}$ (n=1, . . . , N) and $F^{(h)}$ and letting them be zero, obtain $$F^{(m)}=\left[\sum_{i=1}^{I}\sum_{j=1}^{N_i}\tilde{Y}_{(m)}^{ij}\overline{F}^{(m)}\text{Diag}(h_i^T F^{(h)})\right]$$

$$\left[(\overline{F}^{(m)T}\overline{F}^{(m)})\odot\left(NF^{(h)T}\sum_h F^{(h)}+F^{(h)T}\tilde{H}\tilde{H}^T F^{(h)}\right)\right]^{-1}$$

$$F^{(h)}=\left[\tilde{H}\tilde{H}^T+N\sum_h\right]^{-1}\left[\sum_{i=1}^{I}\sum_{j=1}^{N_i}h_i[\text{diag}(\overline{F}^{(m)T}\tilde{Y}_{(m)}^{(ij)T}F^{(m)})]^T\right]$$

$$[(F^{(m)T}F^{(m)})\odot(\overline{F}^{(m)T}\overline{F}^{(m)})]^{-1}.$$

In which $\tilde{Y}_{(m)}^{ij}$ presents the mode-m metricized version of $\tilde{y}_{ij}$. And $\tilde{y}_{ij}=y_{ij}-\mathcal{W}\times_{(M+1)}g_{ij}$.

Taking derivatives of $\tilde{\mathcal{L}}$ with respect to $W^{(m)}$ (m=1, . . . , M) and $W^{(h)}$, and letting them be zero, obtain $$W^{(m)} = \left[\sum_{i=1}^{I}\sum_{j=1}^{N_i} \hat{Y}_{(m)}^{ij} \overline{W}^{(m)} \text{Diag}(g_{ij}^T W^{(g)})\right]$$

$$\left[(\overline{W}^{(m)T}\overline{W}^{(m)}) \odot \left(NW^{(g)T}\sum_g W^{(g)} + W^{(g)T}GG^T W^{(g)}\right)\right]^{-1}$$

and $$W^{(h)} = \left[GG^T + N\sum_g\right]^{-1} \left[\sum_{i=1}^{I}\sum_{j=1}^{N_i} g_{ij} \left[\text{diag}(\overline{W}^{(m)T}\hat{Y}_{(m)}^{(ij)T} W^{(m)})\right]^T\right]$$

$$\left[(\overline{W}^{(m)T} W^{(m)}) \odot (\overline{W}^{(m)T} W^{(m)})\right]^{-1}.$$

Recognition Classifier

Figure 2:
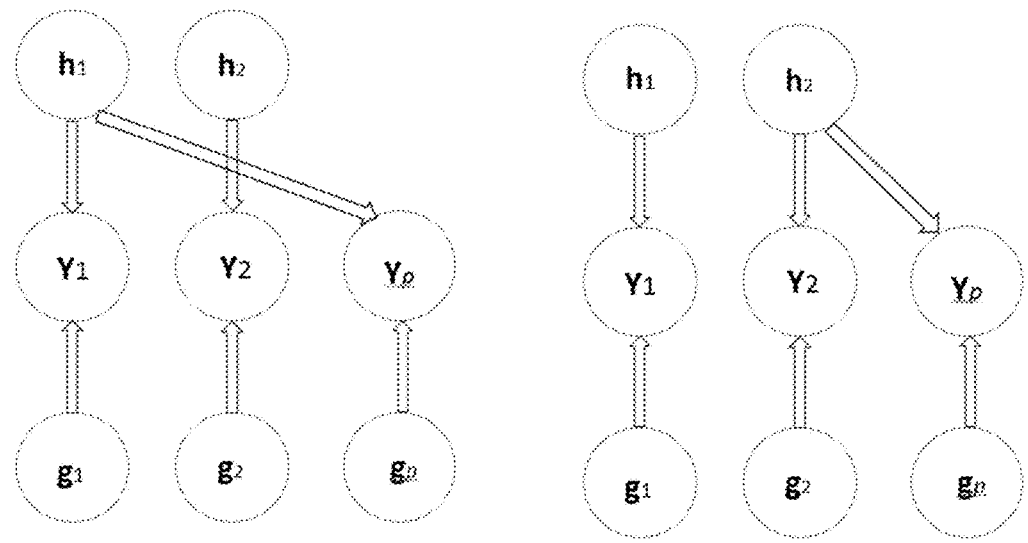
FIG. 2 shows a graphic illustration of probabilistic recognition method according to the present invention.

For a sample $Y_p$ to be classified, we judge its category by calculating the likelihood under a model. The key point of recognition is that samples in the same class share the same identity variable. Assuming $Y_{1 \ldots N}$ is observed samples, if $Y_p$ and one particular Yi belong to the same category, they shall share the same h. For example, in FIG. 2, the left subfigure shows Y1 and Yp belongs to the same category and both of identity variables are h1. In this case, we note the likelihood of observed samples and Yp as $p_1(Y_1, Y_2, Y_p)$. The right subfigure shows Yp and Y2 came from the same category with the identity variable h2 and the likelihood can be represented as $p_2(Y_1, Y_2, Y_p)$. Then we compare $p_1$ and $p_2$, and find out the largest likelihood value. Thus, Yp belongs to the sample's label corresponding to the largest likelihood. The likelihood of samples can be calculated as follows.

Because $Y_{ij}$ follows a matrix-variate normal conditioned on the latent variables h and g. For convenience, we work with $p(y_{ij})$ instead of $p(Y_{ij})$. Here, we note $y_{ij}:=\text{vec}(Y_{ij})$. Thus, the proposed model (1) can become $$y_{ij} = Fh_i + Wg_{ij} + e_{ij}$$

Where $F = (F^{(2)} \odot F^{(1)})F^{(h)T}$ and $W = (W^{(2)} \odot W^{(1)})W^{(g)T}$. These factor matrices have been learned in training phrase, which are known to the recognition processing. Thus, the likelihood of N equals $$p_n(y_{1 \ldots N,p}) = \prod_{i=1, i \neq n}^{N} p(y_i) p(y_p, y_n) \quad (20)$$

Next, we illustrate the marginal distribution of n images $y_{1 \ldots n}$ that share the same identity variable h. The generative equations become $$\begin{bmatrix} y_1 \\ y_2 \\ \vdots \\ y_n \end{bmatrix} = \begin{bmatrix} F & W & 0 & \ldots & 0 \\ F & 0 & W & \ldots & 0 \\ \vdots & \vdots & \vdots & \ddots & \vdots \\ F & 0 & 0 & \ldots & W \end{bmatrix} \begin{bmatrix} h \\ g_1 \\ g_2 \\ \vdots \\ g_n \end{bmatrix} + \begin{bmatrix} e_1 \\ e_2 \\ \vdots \\ e_n \end{bmatrix} \quad (5)$$

noting, $$y' = Az' + m' + e'$$

Taking the following probabilistic assumption $$p(z') = \mathcal{N}(0, I)$$

and $$p(e') = \mathcal{N}(0, \sigma^2 I)$$

Converts the model (5) into the form of probabilistic PCA. Thus, the marginal distribution over the observed y' can be easily obtained by integrating out the latent variables as $$p(y') = \mathcal{N}(m', AA^T + \sigma^2 I) \quad (21)$$

By (21), both $p(y_i)$ and $p(y_p, y_n)$ (20) can be calculated and then we can obtain $p_n(y_1, \ldots, N, p)$. Comparing all $p_n(y_1, \ldots, N, p)$ and finding out the largest value, then the sample Yp is divided into the sample's label corresponding to the largest $p_n(y_1, \ldots, N, p)$ Experimental Effect of the Invention The following two public databases are used to test the reconstruction experiment.

1) The Extended Yale Face Database (http://vision.ucsd.edu/content/yale-face-database)

All images in extended Yale database were captured from 38 individuals with total of 2414 frontal face images. There are 59-64 images for each individual and these images were captured in different laboratories with the same lighting conditions. In each individual, we randomly select 40 images as training sample and the remaining images as a testing sample. The resolution of all images is cropped and normalized to 32*32 pixels. Table 1 lists the comparison results between the invention and the traditional PLDA method, including the number of free parameters of projections, reconstruction results, and recognition rates. In the two methods, reduced dimension is K1=38, K2=50 on extended Yale database. The larger the reconstruction error value in the list, the better the reconstruction effect. We run each experiment ten times and record the mean recognition rate and variance. The results of TPLDA algorithm are given under four cases: R1=R2=170,200,250. From these results, we can see that the number of free parameters of TPLDA is lower than PLDA algorithm with comparable recognition rates obviously.

TABLE 1

| | PLDA | TPLDA | | |
| --- | --- | --- | --- | --- |
| | | 170 | 200 | 250 |
| The number of free parameter | 90112 | 25184 | 28244 | 33344 |
| Reconstruction error | 0.8511 | 0.8686 | 0.8754 | 0.8837 |
| Recognition rate | 0.9512 ± 0.0027 | 0.9555 ± 0.0034 | 0.9588 ± 0.0032 | 0.9585 ± 0.0029 |

Figure 3:
FIG. 3 shows a visual effect of the reconstruction of the invention on the extended Yale database.

FIG. 3 shows the reconstruction visual results on extended Yale database. The first row shows 12 original images. The second row lists the images reconstructed by subspace component $\mathcal{F} \times_3 h_i^T$, which are the same for each identity and they did not contain illumination information. The reconstructed images $\mathcal{W} \times_3 g_{ij}^T$ are shown in the third row. We can observe that the reconstructed images by $\mathcal{W} \times_3 g_{ij}^T$ can illustrate more detailed illumination information.

2) AR Face Database (http://rvl1.ecn.purdue.edu/aleix/aleix_face_DB.html)

The AR face database contains 126 subjects with over 4000 color images. The images of each subject are captured by changing facial expressions, illumination conditions, and occlusions. Each individual contains 26 frontal view images, where the first 13 images are taken in the same period and the last 13 images are taken after 2 weeks. All original images are RGB color images with a size of 768*576. In the experiments, all images are downsampled to 70*60 pixels. In this experiment, 100 individuals are selected, whose first 13 images are used for training and whose last 13 images for testing.

Table 2 lists the comparison results between the invention and the traditional PLDA method, in which reduced dimension is K1=100, K2=100. In this experiment, we record the above-mentioned results under four cases: R1=R2=150,170, 200,250. From this table, we can conclude that when the number of parameters is far less than the number of PLDA parameters, the recognition result is higher than the traditional method.

TABLE 2

|  | PLDA | TPLDA | | | |
|---|---|---|---|---|---|
|  |  | 150 | 170 | 200 | 250 |
| The number of free parameter | 840000 | 69000 | 78200 | 92000 | 115000 |
| Reconstruction error | 0.9165 | 0.9067 | 0.9089 | 0.9113 | 0.9144 |
| Recognition rate | 0.7976 ± 0.0038 | 0.7927 ± 0.0110 | 0.803 ± 0.0102 | 0.8242 ± 0.0058 | 0.8341 ± 0.0053 |

Figure 4:
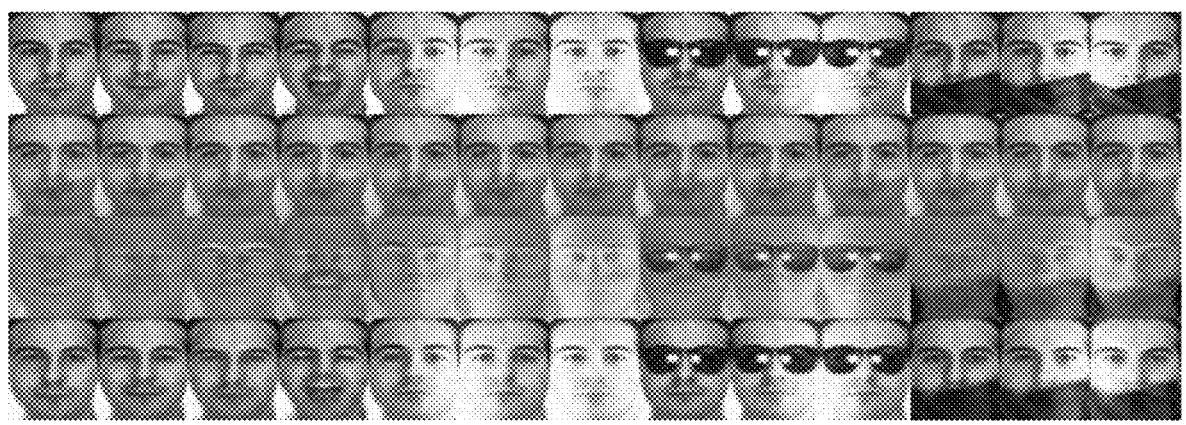
FIG. 4 shows reconstructed images of the invention on AR database.

FIG. 4 shows the reconstructed results of the invention on AR database. All images of an individual are shown in the first row in this figure. The second and third rows are the images reconstructed by $\mathcal{F} \times_3 h_i^T$ and $\mathcal{W} \times_3 g_{ij}^T$, respectively. It can be clearly seen from the figure that the model of the invention can well separate the identity information from details information of a person.

Recognition and Classification of 3D Video Sequences

In order to verify the effectiveness of the proposed method on video sequence, the clustering effect of the method on Ballet database is tested. Ballet database contains 44 video clips and these clips were captured for three subjects performing eight complex action patterns. In this experiment, each video is clipped into subgroup as an image set. Then we can obtain 713 image sets. In training phase, we randomly select one-third samples to train and the left samples are used for testing. Table 3 lists the recognition results of the six algorithms. The reduced dimension is 30, 50 and 70, respectively. From the table, we can see that the proposed algorithm TPLDA can obtain the best results.

TABLE 3

|  | TPLDA | | |
|---|---|---|---|
| Algorithm | 30 | 50 | 70 |
| PCA | 0.8407 | 0.8323 | 0.8365 |
| CP | 0.8394 ± 0.01455 | 0.8216 ± 0.0085 | 0.8115 ± 0.0111 |
| TBV-DR | 0.8476 ± 0.0125 | 0.8430 ± 0.0129 | 0.8361 ± 0.0137 |
| TRPDA | 0.8553 (3, 3, 3) | 0.8491 (5, 5, 3) | 0.8532 (8, 8, 5) |
| STDA | 0.8550 (5, 5, 3) | 0.8512 (10, 10, 5) | 0.8491 (15, 15, 10) |
| TPLDA | 0.8598 ± 0.0178 | 0.8523 ± 0.0149 | 0.08551 ± 0.0170 |

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A processing method for high-order tensor data, comprising: dividing the high-order tensor data into three parts comprising a shared subspace component, a personality subspace component and a noise part; wherein, the shared subspace component and the personality subspace component respectively represent the high-order tensor data as a group of linear combination of a tensor base and a vector coefficient; using a variational EM method to solve the tensor base and the vector coefficient; and designing a classifier to classify a plurality of test samples by comparing an edge distribution of the plurality of samples.

2. The processing method for high-order tensor data according to claim 1, further comprising forming a two dimensional model assuming an observed data set $y=\{Y_{ij}\}_{i=1,j=1}^{I,N_i}$; wherein the observed data set consist of N images of I individuals and each individual has Ni images; Yij represents a jth image of an ith individual and Yij is modeled as formula (1):

$$Y_{ij} = \mathcal{F} \times_3 h_i^T + \mathcal{W} \times_3 g_{ij}^T + M + E_{ij} \quad (1)$$

in the formula (1), $\mathcal{F} \times_3 h_i^T$ or $\mathcal{W} \times_3 g_{ij}^T$ is a generalization of vector representation for a given sample, $\mathcal{F}$ and $\mathcal{W}$ are factor tensors consisting of a plurality of base matrices in a shared subspace and an individual subspace, respectively; $\times_3$ represents a product of tensor and matrix (vector), $h_i \in \mathbb{R}^{K_1}$ is a shared latent variable crossing all of the plurality of images $Y_{i1}, \ldots, Y_{iN_i}$ of object/class i and $g_{ij} \in \mathbb{R}^{K_2}$ represents the vector coefficient of the jth sample of the ith object in the individual space; M is a mean matrix of the high-order data; $E_{ij}$ is a stochastic noise term, each element in the stochastic noise term follows the normal distribution $\mathcal{N}(0, \sigma^2)$.

3. The processing method for high-order tensor data according to the claim 2, wherein, the vector of the formula (1) is formula (2)

$$\text{vec}(Y_{ij}) = Fh_i + Wg_{ij} + \text{vec}(M) + \text{vec}(E_{ij}) \quad (2)$$

wherein, columns $f_{k_1}$ and $w_{k_2}$ in the matrix F and W is respectively k1, k2 face of tensor $\mathcal{F}$ and $\mathcal{W}$, are used to restrict the base tensor by CP decomposition of tensor; wherein, $$\mathcal{F} = [\![\lambda; F^{(1)}, F^{(2)}, F^{(h)}]\!] = \sum_{r=1}^{R_1} \lambda_r f_{1,r}^{(1)} \circ f_{1,r}^{(2)} \circ f_{1,r}^{(h)} \text{ and}$$

$$\mathcal{W} = [\![\eta; W^{(1)}, W^{(2)}, W^{(g)}]\!] = \sum_{r=1}^{R_2} \eta_r w_{1,r}^{(1)} \circ w_{1,r}^{(2)} \circ w_{1,r}^{(g)}.$$

4. The processing method for high-order tensor data according to the claim 3, wherein, Q(h, g, ρ) is any joint distribution over a plurality of hidden variables, a lower bound on a likelihood of the observed data is formula (2), $$\mathcal{L}(\Theta) = \log p(y \mid \Theta) \quad (3)$$

$$\geq \int_h \int_g \int_\rho Q(h, g, \rho) \log \frac{p(y, h, g, \rho)}{Q(h, g, \rho)} dh dg d\rho$$

$$= E_{h,g,\rho}[\log p(y \mid h, g, \rho)] + E_h\left[\log \frac{p(h)}{Q(h)}\right] +$$

$$E_g\left[\log \frac{p(g)}{Q(g)}\right] + E_\rho\left[\log \frac{p(\rho)}{Q(\rho)}\right]$$

$$\triangleq \hat{\mathcal{L}}(Q(h), Q(g), Q(\rho), \Theta)$$

wherein, $Q(h, g, \rho) = Q(h)Q(g)Q(\rho)$.

5. The processing method for high-order tensor data according to claim 1, wherein, a high-order observed data set is $\{y_{ij} | y_{ij} \in \mathbb{R}^{D_1 \times \ldots \times D_M}; i=1, \ldots, I, j=1 \ldots, N_i, \Sigma_i N_i = N\}$; each sample is a tensor of order M, and a linear discriminant analysis model of the higher-order tensor is formula (4)

$$y_{ij} = \mathcal{F} \times_{(M+1)} h_i^T + \mathcal{W} \times_{(M+1)} g_{ij}^T + \mathcal{E}_{ij} \quad (4);$$

wherein $h_i \in \mathbb{R}^{K_1}$, $g_{ij} \in \mathbb{R}^{K_2}$, $\mathcal{F}$ and $\mathcal{W}$ are a tensor of order (M+1), wherein a size of $\mathcal{F}$ and $\mathcal{W}$ is respectively $D_1 \times \ldots \times D_M \times K_1$ and $D_1 \times \ldots \times D_M \times K_2$; wherein, the base tensor has a structure of CP decomposition, $$\mathcal{F} = [\![F^{(1)}, F^{(2)}, \ldots, F^{(M)}, F^{(h)}]\!]$$

$$= \sum_{r=1}^{R_1} f_{1,r}^{(1)} \circ f_{1,r}^{(2)} \circ \ldots \circ f_{1,r}^{(M)} \circ f_{1,r}^{(h)}$$

and $$\mathcal{W} = [\![W^{(1)}, W^{(2)}, \ldots, W^{(M)}, W^{(g)}]\!]$$

$$= \sum_{r=1}^{R_2} w_{1,r}^{(1)} \circ w_{1,r}^{(2)} \circ \ldots \circ w_{1,r}^{(M)} \circ w_{1,r}^{(g)}$$

6. The processing method for high-order tensor data according to claim 5, wherein, for a higher-order model, an EM algorithm is used to solve a problem, a posterior of $h_i$ is a multivariate normal distribution; a mean matrix and a covariance matrix are, respectively, $$\bar{h}_i = \left(\sum_{\mathcal{F}} + \frac{1}{\bar{\rho} N_i} I_{K_1}\right) a_i$$

$$\sum_h = \left(I_{K_1} + \frac{\bar{\rho} N}{I} \sum_{\mathcal{F}}\right)^{-1}$$

where, $$\Sigma_\mathcal{F} = F^{(h)}[(F^{(m)T}F^{(m)}) \odot (\overline{F}^{(m)T}\overline{F}^{(m)})]F^{(h)T}$$

$$a_i = F^{(h)} \text{diag}(F^{(m)T} Y_{(m)}^i \overline{F}^{(m)}),$$

where $\odot$ represents the Hadamard elementwise product;

$$\bar{y}_i = \frac{1}{N_i}\sum_{j=1}^{N_i}(y_{ij} - \mathcal{W} \times_{(M+1)} g_{ij}),$$

wherein, $\overline{Y}_{(m)}^i$ represents a mode-m metricized version of $\bar{y}_i$, and $$\overline{F}^{(m)} = F^{(M)} \circledast \ldots \circledast F^{(m+1)} \circledast F^{(m-1)} \circledast \ldots \circledast F^{(1)}$$

where $\circledast$ represents the Khatri-Rao product;

by computing, the posterior of $\bar{g}_{ij}$ is a multivariate Gauss distribution, and a mean and a covariance of a latent variable $g_{ij}$ are $$\bar{g}_{ij} = (\Sigma_\mathcal{W} + 1/\bar{\rho} I_K)^{-1} b_{ij}$$

$$\Sigma_g = (I_K + \bar{\rho} \Sigma_\mathcal{W})^{-1}$$

where $$b_{ij} = W^{(g)} \text{diag}(W^{(m)T} \hat{Y}_{(m)}^{ij} \overline{W}^{(m)})$$

$$\Sigma_\mathcal{W} = W^{(g)}[(W^{(m)T}W^{(m)}) \odot (\overline{W}^{(m)T}\overline{W}^{(m)})]W^{(g)T}$$

wherein, $\hat{y}_{ij} = y_{ij} - \mathcal{F} \times_{(M+1)} h_i^T$, and $\hat{Y}_{(m)}^{ij}$ represents a mode-m metricized version of $\hat{y}_{ij}$; and $$\overline{W}^{(m)} = W^{(M)} \circledast \ldots \circledast W^{(m+1)} \circledast$$
$$W^{(m-1)} \circledast \ldots \circledast W^{(1)}$$

an optimal $Q^*(\rho)$ is a Gamma distribution;

in M-step, taking derivatives of $\hat{\mathcal{L}}$ with respect to $F^{(n)}$ (n=1, ..., N) and $F^{(h)}$, to be zero, obtain $$F^{(m)} = \left[\sum_{i=1}^{I}\sum_{j=1}^{N_i} \tilde{Y}_{(m)}^{ij} \overline{F}^{(m)} \text{Diag}(h_i^T F^{(h)})\right]$$

$$\left[(\overline{F}^{(m)T}\overline{F}^{(m)}) \odot \left(NF^{(h)T}\sum_h F^{(h)} + F^{(h)T}\tilde{H}\tilde{H}^T F^{(h)}\right)\right]^{-1}$$

$$F^{(h)} = \left[\tilde{H}\tilde{H}^T + N\sum_h\right]^{-1}\left[\sum_{i=1}^{I}\sum_{j=1}^{N_i} h_i [\text{diag}(\overline{F}^{(m)T}\tilde{Y}_{(m)}^{(ij)T}F^{(m)})]^T\right]$$

$$[(F^{(m)T}F^{(m)}) \odot (\overline{F}^{(m)T}\overline{F}^{(m)})]^{-1}.$$

wherein, $\tilde{Y}_{(m)}^{ij}$ represents a mode-m metricized version of $\tilde{y}_{ij}$; and $\tilde{y}_{ij} = y_{ij} - \mathcal{W} \times_{(M+1)} g_{ij}$, taking derivatives of $\hat{\mathcal{L}}$ with respect to $W^{(m)}$ (m=1, ..., M) and $W^{(h)}$, to be zero, obtain $$W^{(m)} = \left[\sum_{i=1}^{I}\sum_{j=1}^{N_i} \hat{Y}_{(m)}^{ij} \overline{W}^{(m)} \text{Diag}(g_{ij}^T W^{(g)})\right]$$

$$\left[(\overline{W}^{(m)T}\overline{W}^{(m)}) \odot \left(NW^{(g)T}\sum_g W^{(g)} + W^{(g)T}GG^T W^{(g)}\right)\right]^{-1}$$

and $$W^{(h)} = \left[GG^T + N\sum_g\right]^{-1}\left[\sum_{i=1}^{I}\sum_{j=1}^{N_i} g_{ij}[\text{diag}(\overline{W}^{(m)T}\hat{Y}_{(m)}^{(ij)T}W^{(m)})]^T\right]$$

$$[(W^{(m)T}W^{(m)}) \odot (\overline{W}^{(m)T}\overline{W}^{(m)})]^{-1}.$$

7. The processing method for high-order tensor data according to claim 6, wherein, for a sample $Y_p$ to be classified, in a category by calculating a likelihood under a model; a key point of recognition is the plurality of samples in a same class share a same identity variable; assuming $Y_{1 \ldots N}$ is a plurality of observed samples, if $Y_p$ and one particular Yi belong to a same category, $Y_p$ and one particular Yi share a same h.

8. The processing method for high-order tensor data according to claim 7, wherein, Y1 and Yp belongs to the same category and both of identity variables are h1; a likelihood of the plurality of observed samples and Yp as $p_1(Y_1, Y_2, Y_p)$, Yp and Y2 came from the same category with the identity variable h2 and the likelihood is represented as $p_2(Y_1, Y_2, Y_p)$; then comparing $p_1$ and $p_2$, and finding out a largest likelihood value; where Yp belongs to a sample's label corresponding to the largest likelihood; the likelihood of the plurality of samples is calculated as follows;

$Y_{ij}$ follows a matrix-variate normal conditioned on a latent variables h and g; proposing a model $$y_{ij} = Fh_i + Wg_{ij} + e_{ij}$$

wherein, $y_{ij} := \text{vec}(Y_{ij})$, $F = (F^{(2)} \odot F^{(1)})F^{(h)T}$ and $W = (W^{(2)} \odot W^{(1)})W^{(g)T}$; a plurality of factor matrices have been learned in a training phrase, the plurality of factor matrices are known to a recognition processing; the likelihood of N equals $$p_n(y_{1...N,p}) = \prod_{i=1, i \neq n}^{N} p(y_i) p(y_p, y_n); \quad (20)$$

illustrating a marginal distribution of n images $y_{1 \ldots n}$ that share the same identity variable h; Forming generative equations $$\begin{bmatrix} y_1 \\ y_2 \\ \vdots \\ y_n \end{bmatrix} = \begin{bmatrix} F & W & 0 & \ldots & 0 \\ F & 0 & W & \ldots & 0 \\ \vdots & \vdots & \vdots & \ddots & \vdots \\ F & 0 & 0 & \ldots & W \end{bmatrix} \begin{bmatrix} h \\ g_1 \\ g_2 \\ \vdots \\ g_n \end{bmatrix} + \begin{bmatrix} e_1 \\ e_2 \\ \vdots \\ e_n \end{bmatrix}, \quad (5)$$

wherein, $$y' = Az' + m' + e'$$

taking the following probabilistic assumption $$p(z') = \mathcal{N}(0, I)$$

and $$p(e') = \mathcal{N}(0, \sigma^2 I)$$

converting the model (5) into the form of probabilistic PCA to obtain the marginal distribution over the observed y' by integrating out the latent variables as $$p(y') = \mathcal{N}(m', AA^T + \sigma^2 I) \quad (21);$$

using (21), calculating both $p(y_i)$ and $p(y_p, y_n)$ and in (20) and then obtaining $p_n(y_1, \ldots, N, p)$; comparing all $p_n(y_1, \ldots, N, p)$ and finding out a largest value, then dividing the sample Yp the sample's label corresponding to the largest $p_n(y_1, \ldots, N, p)$.

* * * * *